(12) United States Patent
Su et al.

(10) Patent No.: US 12,205,558 B2
(45) Date of Patent: Jan. 21, 2025

(54) BULLET-SCREEN COMMENT DISPLAY

(71) Applicant: Shanghai Bilibili Technology Co., Ltd., Shanghai (CN)

(72) Inventors: Zhenyu Su, Shanghai (CN); Jiangnan Yan, Shanghai (CN); Yusheng Dong, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 219 days.

(21) Appl. No.: 18/111,926

(22) Filed: Feb. 21, 2023

(65) Prior Publication Data

US 2023/0282185 A1  Sep. 7, 2023

(30) Foreign Application Priority Data

Feb. 22, 2022  (CN) .......................... 202210164812.4

(51) Int. Cl.
*G09G 5/14* (2006.01)
*H04N 21/414* (2011.01)
*H04N 21/431* (2011.01)
*H04N 21/4788* (2011.01)

(52) U.S. Cl.
CPC ......... *G09G 5/14* (2013.01); *H04N 21/41407* (2013.01); *H04N 21/4316* (2013.01); *H04N 21/4788* (2013.01); *G09G 2320/0613* (2013.01); *G09G 2340/125* (2013.01)

(58) Field of Classification Search
None
See application file for complete search history.

(56) References Cited

U.S. PATENT DOCUMENTS

| 2018/0255346 A1* | 9/2018 | Guo | H04N 21/4858 |
| 2020/0014876 A1* | 1/2020 | Li | H04N 21/4756 |
| 2020/0058270 A1* | 2/2020 | Li | H04N 21/475 |

FOREIGN PATENT DOCUMENTS

| CN | 105847999 A | 8/2016 |
| CN | 107302717 A | 10/2017 |
| CN | 111083551 A | 4/2020 |
| CN | 114025225 A | 2/2022 |
| WO | 2017096900 A1 | 6/2017 |

* cited by examiner

*Primary Examiner* — Edward Martello
(74) *Attorney, Agent, or Firm* — McAndrews, Held & Malloy, Ltd.

(57) ABSTRACT

This application provides a bullet-screen comment display method. The bullet-screen comment display method includes: obtaining a to-be-displayed target bullet-screen comment; in a case in which a display type of the target bullet-screen comment is a multi-direction bullet-screen comment display type, obtaining a pre-configured motion parameter corresponding to the multi-direction bullet-screen comment display type, where the multi-direction bullet-screen comment display type is a bullet-screen comment display type in which mobile display is performed from a preset start position to multiple preset movement directions; and dynamically displaying the target bullet-screen comment along a target movement direction from the preset start position based on the motion parameter.

20 Claims, 9 Drawing Sheets

BULLET-SCREEN COMMENT DISPLAY

CROSS-REFERENCE TO RELATED APPLICATION

The present application claims priority to Chinese Patent Application No. 202210164812.4, filed with the China National Intellectual Property Administration on Feb. 22, 2022, which is incorporated herein by reference in its entirety.

TECHNICAL FIELD

This application relates to the field of computer technologies, and in particular, to a bullet-screen comment display method. This application also relates to a computing device and a non-transitory computer-readable storage medium.

BACKGROUND

With rapid development of computer technologies and Internet technologies, various network entertainment devices emerge constantly, and people's entertainment requirements are also becoming higher. When a user watches a video or live streaming on a network, to increase interest and interactivity of the user to watch the video or live streaming, a comment caption of the user floats and moves on a display interface of the video or live streaming, that is, a bullet-screen comment for interaction.

SUMMARY

According to a first aspect of the embodiments of this application, a bullet-screen comment display method is provided, including:
  obtaining a to-be-displayed target bullet-screen comment;
  in a case in which a display type of the target bullet-screen comment is a multi-direction bullet-screen comment display type, obtaining a pre-configured motion parameter corresponding to the multi-direction bullet-screen comment display type, where the multi-direction bullet-screen comment display type is a bullet-screen comment display type in which mobile display is performed from a preset start position to multiple preset movement directions; and
  dynamically displaying the target bullet-screen comment along a target movement direction from the preset start position based on the motion parameter.

According to a second aspect of the embodiments of this application, a computing device is provided, including one or more processors; and a memory storing one or more programs configured to be executed by the one or more processors, the one or more programs including instructions for: obtaining a to-be-displayed target bullet-screen comment; in a case in which a display type of the target bullet-screen comment is a multi-direction bullet-screen comment display type, obtaining a pre-configured motion parameter corresponding to the multi-direction bullet-screen comment display type, wherein the multi-direction bullet-screen comment display type is a bullet-screen comment display type in which mobile display is performed from a preset start position to multiple preset movement directions; and dynamically displaying the target bullet-screen comment along a target movement direction from the preset start position based on the motion parameter.

According to a third aspect of the embodiments of this application, a non-transitory computer-readable storage medium is provided, where the non-transitory computer-readable storage medium stores one or more programs including instructions that, when executed by one or more processors of a computing device, cause the computing device to perform operations including: obtaining a to-be-displayed target bullet-screen comment; in a case in which a display type of the target bullet-screen comment is a multi-direction bullet-screen comment display type, obtaining a pre-configured motion parameter corresponding to the multi-direction bullet-screen comment display type, wherein the multi-direction bullet-screen comment display type is a bullet-screen comment display type in which mobile display is performed from a preset start position to multiple preset movement directions; and dynamically displaying the target bullet-screen comment along a target movement direction from the preset start position based on the motion parameter.

DETAILED DESCRIPTION OF EMBODIMENTS

Figure 1:
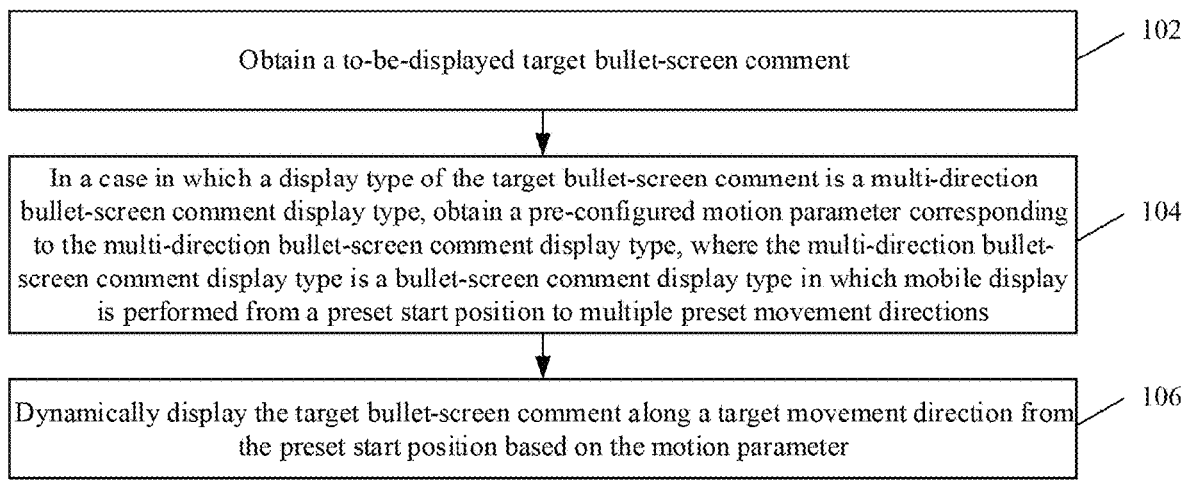
FIG. 1 is a flowchart of a bullet-screen comment display method according to some embodiments of this application.

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a" and "the" of singular forms used in one or more embodiments and the appended claims of this application are also intended to include plural foil is, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of the same type. For example, without departing from the scope of one or more embodiments of this application, "first" may also be referred to as "second", and similarly, "second" may also be referred to as "first". Depending on the context, for example, the word "if" used herein can be explained as "while", "when", or "in response to determining".

The inventor of the present application finds that a bullet-screen comment published by a user is generally displayed in a video or live streaming interface at a specific speed from right to left or from bottom to top. However, in the foregoing method, bullet-screen comments are displayed on a display interface in a same manner, and a display manner is single, thereby easily reducing user interest and user viscosity.

This application provides a bullet-screen comment display method, including: obtaining a to-be-displayed target bullet-screen comment; in a case in which a display type of the target bullet-screen comment is a multi-direction bullet-screen comment display type, obtaining a pre-configured motion parameter corresponding to the multi-direction bullet-screen comment display type, where the multi-direction bullet-screen comment display type is a bullet-screen comment display type in which mobile display is performed from a preset start position to multiple preset movement directions; and dynamically displaying the target bullet-screen comment along a target movement direction from the preset start position based on the motion parameter. When the display type of the target bullet-screen comment is the multi-direction bullet-screen comment display type, different target bullet-screen comments can be dynamically displayed along different target movement directions, thereby avoiding the bullet-screen comment only moving from right to left or from left to right, enriching display manners of the bullet-screen comment, and improving user interest and user viscosity.

This application provides a bullet-screen comment display method. This application also relates to a bullet-screen comment display apparatus, a computing device, and a computer-readable storage medium. The bullet-screen comment processing method, the bullet-screen comment processing apparatus, the computing device, and the computer-readable storage medium are described in detail one by one in the following embodiments.

FIG. 1 is a flowchart of a bullet-screen comment display method according to some embodiments of this application. The method specifically includes the following steps.

Step 102: Obtain a to-be-displayed target bullet-screen comment.

Specifically, the to-be-displayed target bullet-screen comment is any bullet-screen comment that needs to be displayed on a client, and may be a text bullet-screen comment, an expression bullet-screen comment, a picture bullet-screen comment, or a bullet-screen comment with a combination of text and expression.

In a possible implementation of this embodiment of the specification, the client may receive, by using an external device, such as a keyboard or a mouse, a to-be-displayed target bullet-screen comment published by a user.

For example, a user A1 is watching live streaming, and uploads a bullet-screen comment whose content is "I like this performance" by using a voice function (such as a microphone) provided by a client B1. In this case, the client B1 receives the bullet-screen comment, that is, obtains the to-be-displayed target bullet-screen comment.

In a possible implementation of this embodiment of the specification, the client may receive the to-be-displayed target bullet-screen comment sent by a server.

Still using the foregoing example, the client B1 uploads the bullet-screen comment to the server after receiving the bullet-screen comment whose content is "I like this performance". The server detects that a user A2 and the user A1 watch same live streaming, and delivers the bullet-screen comment to a client B2 corresponding to the user A2. In this case, the client B2 receives the bullet-screen comment, that is, obtains the to-be-displayed target bullet-screen comment.

It should be noted that there may be one or more to-be-rendered bullet-screen comments. When there is only one to-be-rendered bullet-screen comment, the bullet-screen comment is a to-be-rendered target bullet-screen comment. When there are multiple to-be-rendered bullet-screen comments, the bullet-screen comments may be sorted according to a priority of each bullet-screen comment, and a bullet-screen comment with a highest priority is determined as the target bullet-screen comment. Alternatively, the bullet-screen comments may be sorted according to a user level of a user corresponding to each bullet-screen comment, and a target bullet-screen comment is determined. That is, a bullet-screen comment with a high user level may be preferentially displayed and rendered, so that a user with a high user level can obtain a preferable bullet-screen comment display opportunity, thereby improving user experience.

For example, a client B3 receives a bullet-screen comment C1 published by a user Jia using an external device of the client B3 when watching a video, and receives a bullet-screen comment C2 published by a user Yi using another client when watching the video and sent by a server. The user Jia is a user corresponding to the client B3, the bullet-screen comment C1 published by the user Jia is a host bullet-screen comment, the user Yi is not a user corresponding to the client B3, and the bullet-screen comment C2 published by the user Yi is a guest bullet-screen comment. A priority of the host bullet-screen comment is higher than that of the guest bullet-screen comment. Therefore, the bullet-screen comment C1 is determined as the target bullet-screen comment.

Step 104: In a case in which a display type of the target bullet-screen comment is a multi-direction bullet-screen comment display type, obtain a pre-configured motion parameter corresponding to the multi-direction bullet-screen comment display type, where the multi-direction bullet-screen comment display type is a bullet-screen comment display type in which mobile display is performed from a preset start position to multiple preset movement directions.

In a possible implementation of this embodiment of the specification, on the basis of obtaining the target bullet-screen comment, if the display type of the target bullet-screen comment is the multi-direction bullet-screen comment display type, the motion parameter corresponding to the multi-direction bullet-screen comment display type is obtained.

Specifically, the preset start position refers to a position at which a bullet-screen comment is displayed in a video playback window or a live streaming window. The preset movement direction is a preset direction in which the bullet-screen comment can be moved, for example, up, down, left, and right. The multi-direction bullet-screen comment display type is a bullet-screen comment display type in which mobile display can be implemented in multiple preset movement directions. The motion parameter refers to a parameter, such as a movement direction, a movement speed, and a movement track, that are corresponding to the bullet-screen comment content in the display process of the bullet-screen comment.

In a possible implementation of this embodiment of the specification, before sending the target bullet-screen comment, the user first selects the display type of the target bullet-screen comment, and then enters the bullet-screen comment content to obtain the target bullet-screen comment, or first enters the bullet-screen comment content, and then selects the display type of the target bullet-screen comment, that is, the target bullet-screen comment carries the display type or an identifier of the display type, where the bullet-screen comment display type includes a one-direction bullet-screen comment display type and a multi-direction bullet-screen comment display type. Locally, after the target bullet-screen comment is obtained, the motion parameter corresponding to the display type or the identifier of the display type is obtained according to the display type or the identifier of the display type carried in the target bullet-screen comment. If the display type is the multi-direction bullet-screen comment display type, or the identifier of the display type represents the multi-direction bullet-screen comment display type, the pre-configured motion parameter corresponding to the multi-direction bullet-screen comment display type is obtained.

In another possible implementation of this embodiment of the specification, when sending the target bullet-screen comment, the user does not select the display type of the target bullet-screen comment, that is, the target bullet-screen comment does not carry the display type or the identifier of the display type. Before locally obtaining the pre-configured motion parameter corresponding to the multi-direction bullet-screen comment display type, it further needs to identify the target bullet-screen comment display type, that is, identifying bullet-screen comment content of the target bullet-screen comment; and determining a display type of the target bullet-screen comment according to the bullet-screen comment content.

Specifically, the bullet-screen comment content refers to a text, an expression, and a picture that are in the target bullet-screen comment. For example, if a text of a bullet-screen comment is "This is so handsome", the bullet-screen comment content is "This is so handsome".

In actual application, after the to-be-displayed target bullet-screen comment is obtained, the bullet-screen comment content of the target bullet-screen comment is locally identified based on a preset identification solution, for example, the bullet-screen comment content is extracted based on a keyword, and the bullet-screen comment content is restored based on data. Further, the display type of the target bullet-screen comment is determined according to the bullet-screen comment content. The bullet-screen comment type can be identified by using the bullet-screen comment content, so that the bullet-screen comment display efficiency can be improved.

In a possible implementation of this embodiment of the specification, when the display type of the target bullet-screen comment is determined according to the bullet-screen comment content, the bullet-screen comment content may be matched with a first feature of the multi-direction bullet-screen comment display type and a second feature of a normal bullet-screen comment display type. If the bullet-screen comment content successfully matches the second feature of the normal bullet-screen comment display type, it is determined that the display type of the target bullet-screen comment is the normal bullet-screen comment display type, where the normal bullet-screen comment display type is a bullet-screen comment display type in which mobile display is performed from the preset start position to a preset movement direction, that is, a one-direction bullet-screen comment display type. If the bullet-screen comment content successfully matches the first feature of the multi-direction bullet-screen comment display type, it is determined that the target bullet-screen comment display type is the multi-direction bullet-screen comment display type. In this way, by matching the bullet-screen comment content with each preset feature, the display type of the target bullet-screen comment can be accurately determined, thereby improving bullet-screen comment display efficiency.

In another possible implementation of this embodiment of the specification, when the display type of the target bullet-screen comment is determined according to the bullet-screen comment content, the bullet-screen comment content may be compared with a preset content feature corresponding to the multi-direction bullet-screen comment display type. If the bullet-screen comment content does not match the preset content feature corresponding to the multi-direction bullet-screen comment display type, it is determined that the target bullet-screen comment display type is a one-direction bullet-screen comment display type. If the bullet-screen comment content matches the preset content feature corresponding to the multi-direction bullet-screen comment display type, it is determined that the display type of the target bullet-screen comment is the multi-direction bullet-screen comment display type. That is, before the obtaining a pre-configured motion parameter corresponding to the bullet-screen comment content, the method further includes:

determining whether the bullet-screen comment content meets a preset content feature corresponding to the multi-direction bullet-screen comment display type; and if yes, determining that the display type of the target bullet-screen comment is the multi-direction bullet-screen comment display type; and if no, determining that the display type of the target bullet-screen comment is a one-direction bullet-screen comment display type.

Specifically, the preset content feature refers to a preset feature that is related to the bullet-screen comment content and that is used to identify a display type of the bullet-screen comment; and the one-direction bullet-screen comment display type is a bullet-screen comment display type in which mobile display is performed from a preset start position to a preset movement direction, that is, a normal bullet-screen comment display type.

In actual application, after the bullet-screen comment content of the target bullet-screen comment is identified, the preset content feature corresponding to the multi-direction bullet-screen comment display type may be first obtained, and then the bullet-screen comment content is compared with the preset content feature to determine whether the bullet-screen comment content meets the preset content feature. If yes, it indicates that the display type of the target bullet-screen comment is the multi-direction bullet-screen comment display type. If not, it indicates that the display type of the target bullet-screen comment is the one-direction bullet-screen comment display type. In this way, the bullet-screen comment content is compared with the preset content feature, so that a comparison amount is reduced, that is, a data processing amount is reduced, and a speed of determining the display type of the target bullet-screen comment is further increased, thereby improving bullet-screen comment display efficiency.

For example, the preset content feature is that only one text or multiple same texts are included. Assuming that content of a bullet-screen comment is "The stars in the sky do not speak", the display type of the bullet-screen comment is a one-direction bullet-screen comment display type. Assuming that content of a bullet-screen comment is "like", the display type of the bullet-screen comment is the multi-direction bullet-screen comment display type. Assuming that content of a bullet-screen comment is "666", the display type of the bullet-screen comment is the multi-direction bullet-screen comment display type.

In addition, after the display type of the target bullet-screen comment is determined, in a case in which the display type of the target bullet-screen comment is the one-direction bullet-screen comment display type, an initial bullet-screen comment display layer corresponding to the one-direction bullet-screen comment display type is determined, and the target bullet-screen comment is rendered and displayed on the initial bullet-screen comment display layer. In a case in which the display type of the target bullet-screen comment is the multi-direction bullet-screen comment display type, the pre-configured motion parameter corresponding to the bullet-screen comment content is obtained.

Step 106: Dynamically display the target bullet-screen comment along a target movement direction from the preset start position based on the motion parameter.

On the basis of identifying the display type of the target bullet-screen comment according to the bullet-screen comment content, and obtaining the motion parameter corresponding to the bullet-screen comment content, the target bullet-screen comment is dynamically displayed along the target movement direction from the preset start position based on the motion parameter.

Specifically, the target movement direction is a direction in which one or more users display the target bullet-screen comment in multiple preset movement directions, that is, a direction in which the target bullet-screen comment moves.

In a possible implementation of this embodiment of the specification, when the user sends the target bullet-screen comment, if the user selects the display type of the target bullet-screen comment as the multi-direction bullet-screen comment display type, the user may further continue to select the target movement direction of the target bullet-screen comment, that is, the target bullet-screen comment carries the target movement direction. After the target bullet-screen comment is obtained, the target bullet-screen comment is dynamically displayed along the target bullet-screen comment movement direction from the preset start position based on the motion parameter and according to the target movement direction carried in the target bullet-screen comment. For example, when the user sends the target bullet-screen comment of the multi-direction bullet-screen comment display type, the user selects "team 1", that is, the user is a supporter of the team 1, the bullet-screen comment (the target bullet-screen comment) sent by the user moves along a movement direction corresponding to "team 1", that is, the movement direction corresponding to "team 1" is the target movement direction, and the target bullet-screen comment is dynamically displayed along the target movement direction from the preset start position based on the motion parameter.

In a possible implementation of this embodiment of the specification, when sending the target bullet-screen comment, the user does not select the display type of the target bullet-screen comment, or selects the display type of the target bullet-screen comment but does not select the target movement direction, that is, the target bullet-screen comment does not carry the target movement direction. Therefore, before the target bullet-screen comment is displayed, the target movement direction corresponding to the target bullet-screen comment needs to be first determined: The target movement direction is determined based on bullet-screen comment content and a correspondence between a preset movement direction and preset bullet-screen comment content, that is, before the dynamically displaying the target bullet-screen comment along a target movement direction from the preset start position based on the motion parameter, the method further includes:

determining, according to a correspondence between a preset movement direction and preset bullet-screen comment content, a target movement direction corresponding to the bullet-screen comment content from the multiple preset movement directions.

Specifically, the preset movement direction refers to a preset direction in which the bullet-screen comment can be moved, for example, up-to-left, down-to-right, leftward, and rightward.

In actual application, each preset movement direction is corresponding to one preset bullet-screen comment content, and different preset movement directions may be corresponding to same preset bullet-screen comment content, or may be corresponding to different preset bullet-screen comment content. The target movement direction is determined from the preset movement direction based on the bullet-screen comment content and according to the correspondence between a preset movement direction and preset bullet-screen comment content. In this way, bullet-screen comment display efficiency can be improved, and variety of bullet-screen comment display can be improved.

Referring to Table 1 Table 1 shows a correspondence, that is, a correspondence between a preset movement direction and preset bullet-screen comment content: There are four preset movement directions, which are respectively upward, downward, leftward, and rightward, and the preset bullet-screen comment content corresponding to the preset movement directions is 1 or multiple 1, 2 or multiple 2, 3 or multiple 3, 4 or multiple 4. Assuming that the bullet-screen comment content is "111111111", the target movement direction is upward.

TABLE 1

| Correspondence | | | | |
|---|---|---|---|---|
| Preset movement direction | Upward | Downward | Leftward | Rightward |
| Preset bullet-screen comment content | 1 or multiple 1 | 2 or multiple 2 | 3 or multiple 3 | 4 or multiple 4 |

Referring to Table 2, Table 2 shows another correspondence: There are four preset movement directions: upward, downward, leftward, and rightward, respectively, and preset bullet-screen comment content corresponding to the four preset movement directions is respectively a number, a number, an expression, and an expression. Assuming that the bullet-screen comment content is "123456789", the target movement directions are upward and downward. Assuming that the bullet-screen comment content is an expression that identifies a smile, the target movement directions are leftward and rightward.

TABLE 2

| Another correspondence | | | | |
|---|---|---|---|---|
| Preset movement direction | Upward | Downward | Leftward | Rightward |
| Preset bullet-screen comment content | Number | Number | Expression | Expression |

It should be noted that the correspondence between a preset movement direction and preset bullet-screen comment content may be delivered by the server, that is, an operator or a maintainer configures the correspondence between a preset movement direction and preset bullet-screen comment content on the server. After the configuration is complete, the server delivers the correspondence between a preset movement direction and preset bullet-screen comment content to each client, or delivers the correspondence to a client that needs to perform multi-direction bullet-screen comment display.

In a possible implementation of this embodiment of the specification, at least one initial rendering track in the target movement direction may be first determined, and then the target bullet-screen comment is dynamically displayed along the target rendering track in the at least one initial rendering track from the preset start position based on the motion parameter. That is, a specific implementation process of dynamically displaying the target bullet-screen comment along a target movement direction from the preset start position based on the motion parameter may be as follows:
    determining, according to the target movement direction, at least one initial rendering track corresponding to the target bullet-screen comment; and
    dynamically displaying the target bullet-screen comment along a target rendering track in the at least one initial rendering track from the preset start position based on the motion parameter.

Specifically, a rendering track refers to a track used to render a bullet-screen comment. Different initial rendering tracks are disposed at different positions, and the bullet-screen comment content can only move horizontally on a fixed rendering track, so that overlapping of the bullet-screen comment content can be avoided. The initial rendering track refers to multiple rendering tracks in the target movement direction.

In actual application, each movement direction is corresponding to one or more initial rendering tracks, and the at least one initial rendering track corresponding to the target movement direction is determined as the at least one initial rendering track corresponding to the target bullet-screen comment. The target bullet-screen comment is then dynamically displayed along the target rendering track in the at least one initial rendering track from the preset start position according to the motion parameter.

In some embodiments, an initial rendering track may be randomly selected from the at least one initial rendering track as the target rendering track, or an initial rendering track may be randomly selected from the at least one initial rendering track as the target rendering track based on a preset rendering track selection policy.

To avoid stacking of bullet-screen comments, an initial rendering track may be randomly selected from the at least one initial rendering track based on the preset rendering track selection policy as the target rendering track, and the target bullet-screen comment is dynamically displayed along the target rendering track. That is, a specific implementation process of dynamically displaying the target bullet-screen comment along a target rendering track in the at least one initial rendering track from the preset start position based on the motion parameter may be as follows:
    determining a target rendering track corresponding to the target bullet-screen comment from the at least one initial rendering track according to a preset rendering track selection policy; and
    dynamically displaying the target bullet-screen comment along the target rendering track from the preset start position based on the motion parameter and according to a preset bullet-screen comment rendering parameter.

Specifically, the rendering track selection policy refers to a preset policy used to select the target rendering track. For example, an idle rendering track is preferentially selected as the target rendering track, or random selection. The bullet-screen comment rendering parameter is a parameter of a bullet-screen comment rendering effect, such as a font, a size, a color, and transparency.

In actual application, the target rendering track is selected from the at least one initial rendering track based on the rendering track selection policy, and then the target bullet-screen comment is dynamically displayed on the target rendering track starting from the preset start position according to the motion parameter and the preset bullet-screen comment rendering parameter.

For example, the rendering track selection policy may be as follows: When the at least one initial rendering track has an idle initial rendering track, that is, an initial rendering track with no displayed bullet-screen comment, an idle initial rendering track is preferably selected as the target rendering track. If no idle initial rendering track exists, an initial rendering track that is in the at least one initial rendering track and whose bullet-screen comment is about to be fully displayed or whose bullet-screen comment has been displayed for preset duration as the target rendering track.

It should be noted that, in a case in which no idle initial rendering track exists, before the initial rendering track that is in the at least one initial rendering track and whose bullet-screen comment is about to be fully displayed or whose bullet-screen comment has been displayed for the preset duration is selected as the target rendering track, whether the initial rendering track meets a rendering condition further needs to be determined: First, a start moment of the target bullet-screen comment and an end moment of a bullet-screen comment that is being displayed on the initial rendering track are calculated, and then it is determined whether the start moment and the end moment meet a same-track rendering rule, that is, whether the start moment is greater than the end moment: If yes, the initial rendering track is determined as the target rendering track; or if no, it is determined whether the target bullet-screen comment is a host bullet-screen comment, that is, a bullet-screen comment sent by a local user; if yes, the initial rendering track is determined as the target rendering track; otherwise, rendering of the target bullet-screen comment is abandoned.

Figure 2:
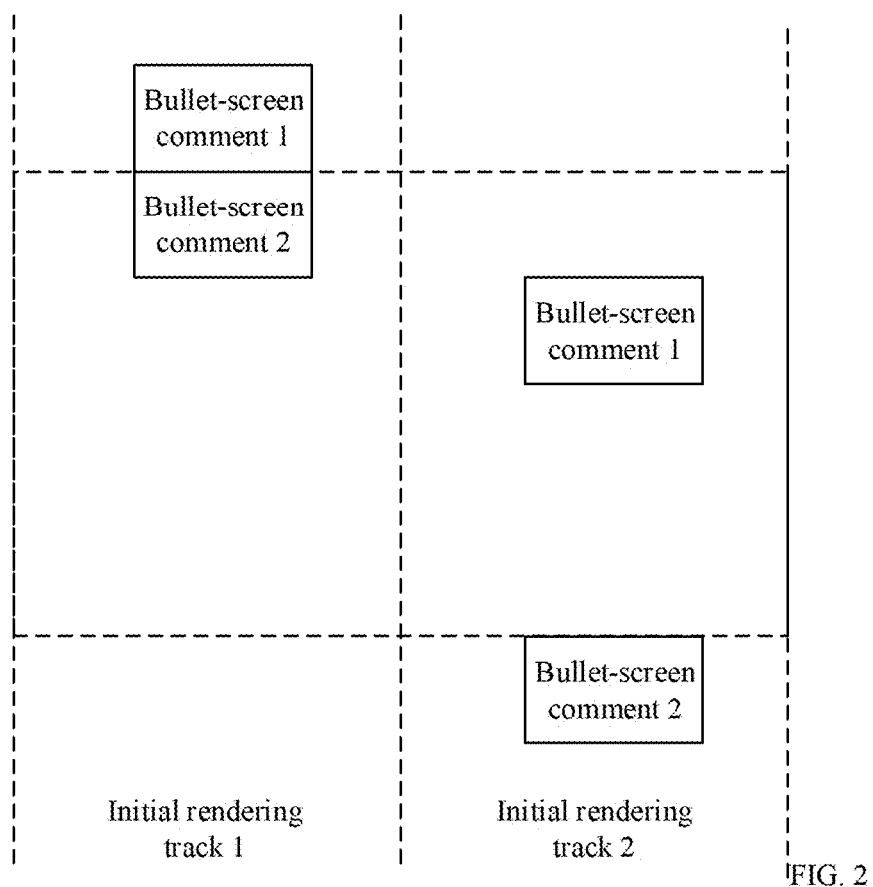
FIG. 2 is a schematic principle diagram of selecting a target rendering track in a bullet-screen comment display method according to some embodiments of this application.

Referring to FIG. 2, FIG. 2 is a schematic principle diagram of selecting a target rendering track in a bullet-screen comment display method according to some embodiments of this application. A bullet-screen comment 1 indicates a bullet-screen comment being displayed, and a bullet-screen comment 2 indicates a target bullet-screen comment 2. In an initial rendering track 1, an end moment of the bullet-screen comment 1 is equal to a start moment of the bullet-screen comment 2. Assuming that the bullet-screen comment 2 is not a host bullet-screen comment, the bullet-screen comment 2 is not rendered in the initial rendering track 1. In an initial rendering track 2, an end moment of the bullet-screen comment 1 is less than a start moment of the bullet-screen comment 2. Assuming that the bullet-screen comment 2 is not a host bullet-screen comment, the initial rendering track 2 is determined as the target rendering track.

In a possible implementation of this embodiment of the specification, the preset rendering parameter may be first obtained, and then the target bullet-screen comment is dynamically displayed along the target rendering track in the at least one initial rendering track from the preset start position based on the motion parameter and the preset rendering parameter, that is, the preset rendering parameter is obtained. The target bullet-screen comment is dynamically displayed along the target movement direction from the preset start position based on the motion parameter and the preset rendering parameter. The preset rendering parameter refers to a preset parameter for rendering the bullet-screen comment, such as a font, a size, a color, transparency, and a bullet-screen comment appearance effect. In this way, in a process of dynamically displaying the target bullet-screen comment, effects of the target bullet-screen comment are different, diversity of bullet-screen comment display is enhanced, user experience is improved, and user viscosity is further improved.

In a possible implementation of this embodiment of the specification, the bullet-screen comment of the multi-direction bullet-screen comment display type is displayed on the target bullet-screen comment display layer, that is, the bullet-screen comment of the one-direction bullet-screen comment display type is different from the bullet-screen comment of the multi-direction bullet-screen comment display type. Therefore, before the target bullet-screen comment of the multi-direction bullet-screen comment display type is displayed, a preset configuration file needs to be obtained to display the target bullet-screen comment display layer, so as to provide a function of displaying the bullet-screen comment of the multi-direction bullet-screen comment display type. That is, before the dynamically displaying the target bullet-screen comment along a target movement direction from the preset start position based on the motion parameter, the method further includes:

obtaining a preset configuration file corresponding to the multi-direction bullet-screen comment display type; and configuring a target bullet-screen comment display layer based on the preset configuration file, where the target bullet-screen comment display layer is a layer that displays the multi-direction bullet-screen comment display type.

Specifically, the preset configuration file refers to a preset file that is used to configure a parameter composition of the target bullet-screen comment display layer. The target bullet-screen comment display layer is a layer specially used to display the bullet-screen comment of the multi-direction bullet-screen comment display type.

In actual application, when enabling the display function of the bullet-screen comment of the multi-direction bullet-screen comment display type, the client obtains, from the server, the preset configuration file corresponding to the multi-direction bullet-screen comment display type, or obtains, from a storage area, the preset configuration file corresponding to the multi-direction bullet-screen comment display type that is delivered in advance by the server. Then the client configures the target bullet-screen comment display layer according to the preset configuration file, so as to display the bullet-screen comment of the multi-direction bullet-screen comment display type. In this way, a basis for displaying the bullet-screen comment of the multi-bullet-screen comment display type can be established, which helps improve efficiency of displaying the bullet-screen comment.

In some embodiments, the preset configuration file includes a display area configuration file and a start position configuration file. In this case, a specific implementation process of configuring a target bullet-screen comment display layer based on the preset configuration file may be as follows:

determining a bullet-screen comment display area from the target bullet-screen comment display layer based on the display area configuration file; and determining the preset start position in the bullet-screen comment display area based on the start position configuration file.

Specifically, the display area configuration file refers to a preset file that is used to configure the bullet-screen comment display area in the target bullet-screen comment display layer. The bullet-screen comment display area refers to an area where the bullet-screen comment is displayed in the target bullet-screen comment display layer. The start position configuration file is a file for configuring the preset start position.

In an actual application, the bullet-screen comment display area used for displaying the bullet-screen comment is determined in the target bullet-screen comment display layer according to a parameter in the display area configuration file; and then, the preset start position is determined in the bullet-screen comment display area according to a parameter in the start position configuration file.

Figure 3:
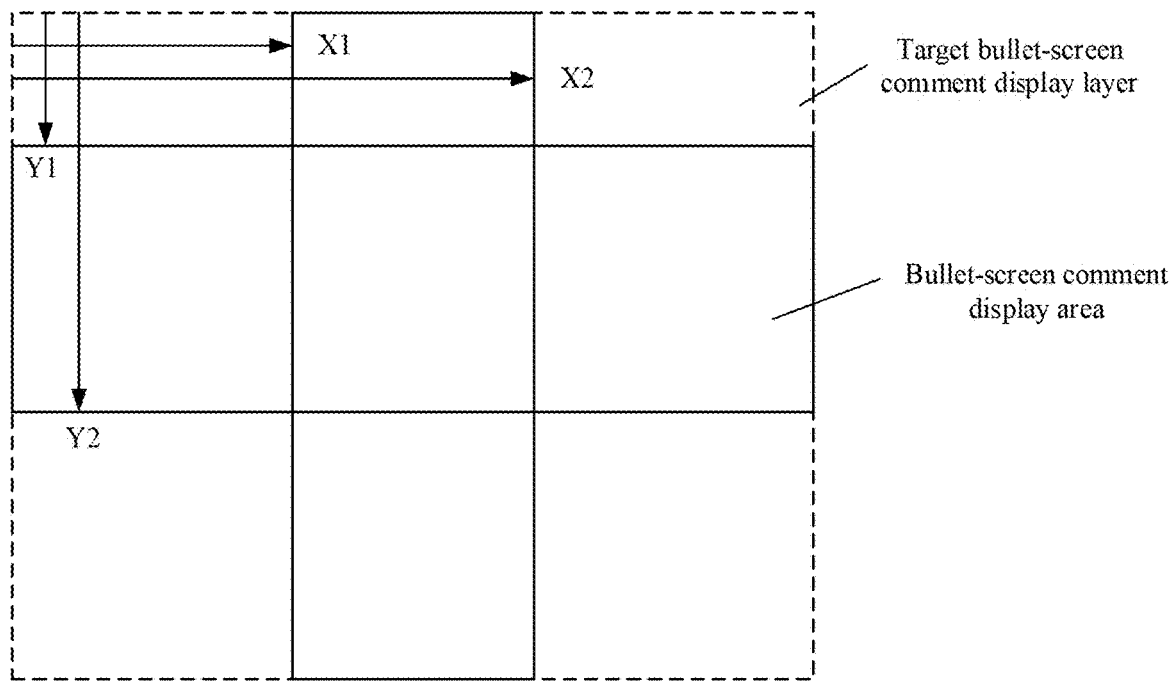
FIG. 3 is a schematic interface diagram of a bullet-screen comment display area in a bullet-screen comment display method according to some embodiments of this application.

For example, the display area configuration file includes four boundary parameters, a left boundary X1 in a vertical direction and a right boundary X2 in the vertical direction, a left boundary Y1 in a horizontal direction, and a right boundary Y2 in the horizontal direction, and X1, X2, Y1, and Y2 are all decimals between 0 and 1. Referring to FIG. 3, FIG. 3 is a schematic interface diagram of a bullet-screen comment display area in a bullet-screen comment display method according to some embodiments of this application. X1, X2, Y1, and Y2 are respectively 0.35, 0.65, and 0.2, and 0.6. According to X1, X2, Y1, and Y2, a "cross" area determined at the target bullet-screen comment display layer is a bullet-screen comment display area.

Figure 4:
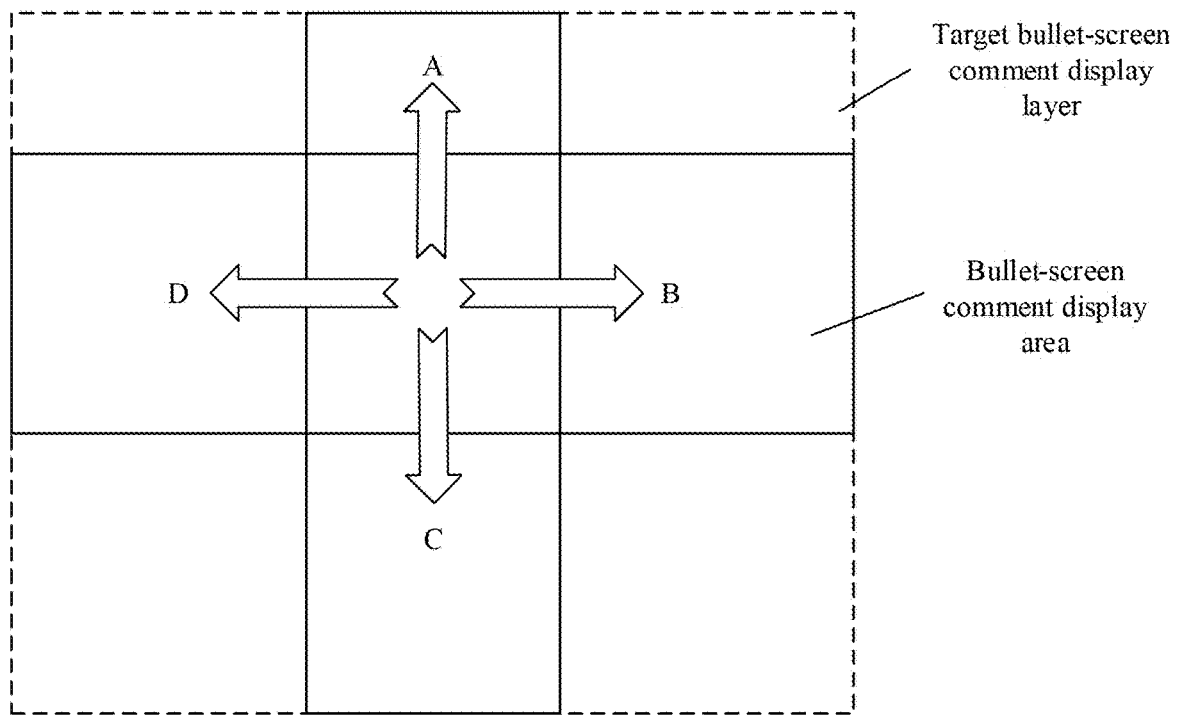
FIG. 4 is a schematic interface diagram of a preset movement direction in a bullet-screen comment display method according to some embodiments of this application.

Referring to FIG. 4, FIG. 4 is a schematic interface diagram of a preset movement direction in a bullet-screen comment display method according to some embodiments of this application. There are four preset movement directions in the bullet-screen comment display area of the target bullet-screen comment display layer, where A represents upward, B represents rightward, C represents downward, and D represents leftward. That is, the configuration file includes four parameters A, B, C, and D, used to set the preset movement directions in the bullet-screen comment display area.

Figure 5:
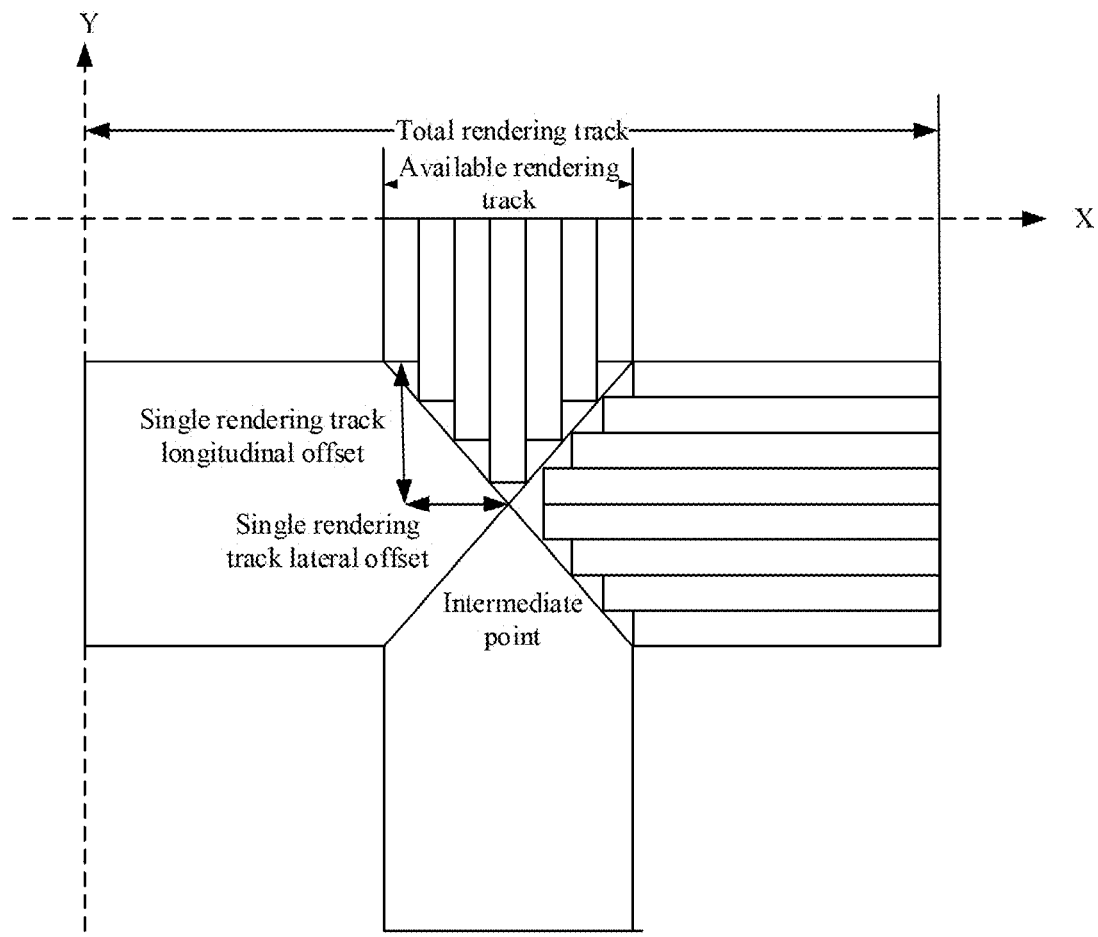
FIG. 5 is a schematic interface diagram of a bullet-screen comment display area in another bullet-screen comment display method according to some embodiments of this application.

Referring to FIG. 5, FIG. 5 is a schematic interface diagram of a bullet-screen comment display area according to another bullet-screen comment display method according to some embodiments of this application. Using the upward movement direction as an example, when the preset start position is determined in the bullet-screen comment display area based on the start position configuration file, a total rendering track, an available rendering track, a single rendering track longitudinal offset, and a single rendering track lateral offset may be determined, and then the preset start position is determined based on an intermediate point.

For example, set a parameter k=relative proportion=$(X2-X1)/(Y2-Y1)$; v=wide intermediate point (%)=$(X2+X1)/2$;

n=high intermediate point (%)=(Y2+Y1)/2; abs( ) means an absolute value. X1, X2, Y1, and Y2 are respectively four boundary parameters of the display area configuration file: a left boundary in the vertical direction, a right boundary in the vertical direction, a left boundary in the horizontal direction, and a right boundary in the horizontal direction, and X1, X2, Y1, and Y2 are all decimals between 0 and 1.

For the upward target bullet-screen comment:
total number of tracks=player width (px)/single track width (px); (the single track width is a fixed value 20 px, so as to ensure that a larger number of bullet-screen comment tracks exist on a larger screen);
number of available tracks=total number of tracks*(X2−X1);
bullet-screen comment lateral offset (%)=track coordinates/total number of tracks; (starting from the coordinate origin, the X-axis is offset, and the offset percentage is the percentage relative to the screen width); and
bullet-screen comment longitudinal offset (px)=n*player height (px)−current bullet-screen comment height (px)−abs (bullet-screen comment lateral offset−v)/k*player height (px); (starting from the coordinate origin, and the Y-axis is offset).

For the rightward target bullet-screen comment:
total number of tracks=player height (px)/single track height (px); (the single track height is a fixed value 30 px, so as to ensure that a larger number of bullet-screen comment tracks exist on a larger screen);
number of available tracks=total number of tracks*(Y2−Y1);
bullet-screen comment longitudinal offset (%)=track coordinates/total number of tracks; (starting from the coordinate origin, the Y-axis is offset, and the offset percentage is the percentage relative to the screen height); and
bullet-screen comment horizontal offset (px)=(1−v)*player width (px)−current bullet-screen comment width (px)−abs (bullet-screen comment horizontal offset−n)*k*player width (px); (starting from the coordinate origin, and the X-axis is offset).

For the downward target bullet-screen comment:
total number of tracks=player width (px)/single track width (px); (the single track width is a fixed value 20 px, so as to ensure that a larger number of bullet-screen comment tracks exist on a larger screen);
number of available tracks=total number of tracks*(X2−X1);
bullet-screen comment lateral offset (%)=track coordinates/total number of tracks; (starting from the coordinate origin, the X-axis is offset, and the offset percentage is the percentage relative to the screen width); and
bullet-screen comment longitudinal offset (px)=(1−n)*player height (px)−current bullet-screen comment height (px)−abs (bullet-screen comment lateral offset−v)/k*player height (px); (starting from the coordinate origin, and the Y-axis is offset).

For the leftward target bullet-screen comment:
total number of tracks=player height (px)/single track height (px); (the single track height is a fixed value 30 px, so as to ensure that a larger number of bullet-screen comment tracks exist on a larger screen);
number of available tracks=total number of tracks*(Y2−Y1);
bullet-screen comment longitudinal offset (%)=track coordinates/total number of tracks; (starting from the coordinate origin, the X-axis is offset, and the offset percentage is the percentage relative to the screen width); and
bullet-screen comment horizontal offset (px)=v*player width (px)−current bullet-screen comment width (px)−abs (bullet-screen comment horizontal offset−n)*k*player width (px); (starting from the coordinate origin, and the X-axis is offset).

Figure 6:
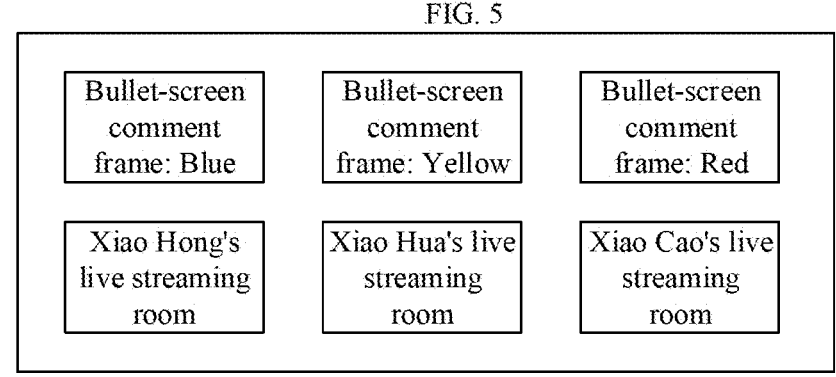
FIG. 6 is a schematic diagram of a color of a bullet-screen comment frame in a bullet-screen comment display method according to some embodiments of this application.

It should be noted that, for a guest bullet-screen comment or a host bullet-screen comment, a text color of the bullet-screen comment may be a uniform color, such as white, or may be several random colors. The bullet-screen comment may have multiple preset font sizes, and then the font size is randomly selected from the preset multiple font sizes during display, for example, three font sizes are set: 24 xp, 20 xp, and 15 xp. Different live streaming rooms or virtual rooms watched via videos may deliver bullet-screen comment frames of host bullet-screen comments of different colors, and the colors may be freely configured. Referring to FIG. 6, FIG. 6 is a schematic color diagram of a bullet-screen comment frame in a bullet-screen comment display method according to some embodiments of this application. For example, a bullet-screen comment frame of a host bullet-screen comment of Xiao Hong's live streaming room is blue, a bullet-screen comment frame of a host bullet-screen comment of Xiao Ming's live streaming room is yellow, and a bullet-screen comment frame of a host bullet-screen comment of Xiao Cao's live streaming room is red.

Figure 7:
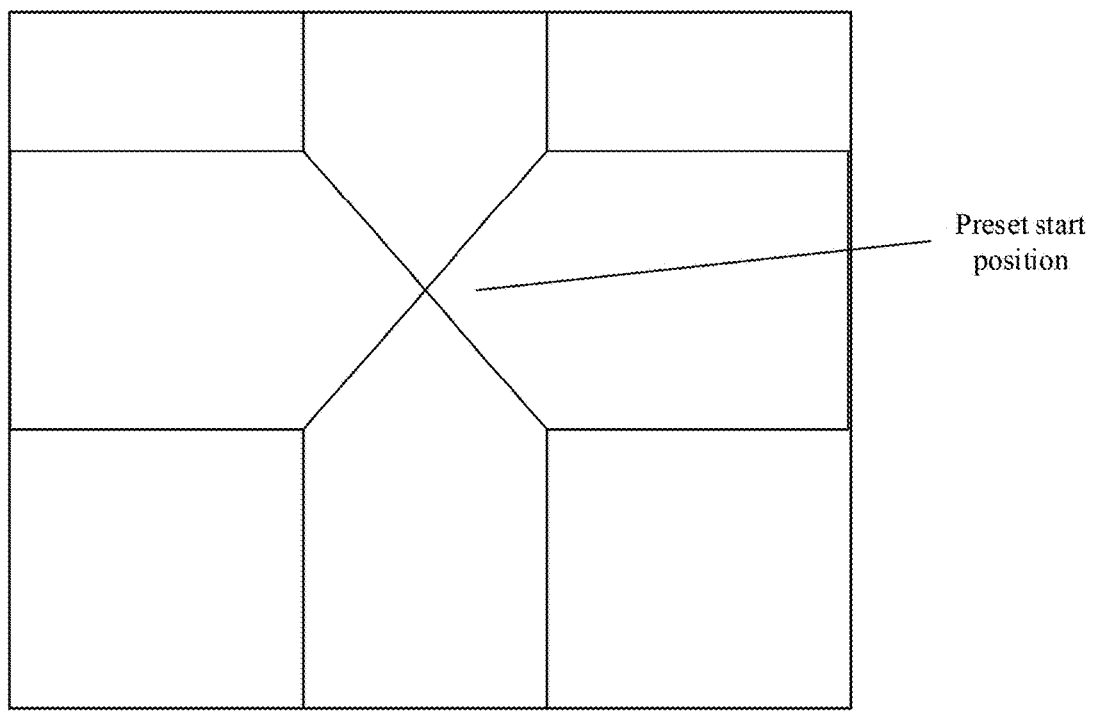
FIG. 7 is a schematic interface diagram of a preset start position in a bullet-screen comment display method according to some embodiments of this application.

Referring to FIG. 7, FIG. 7 is a schematic interface diagram of a preset start position in a bullet-screen comment display method according to some embodiments of this application. The preset start position is X-shaped.

It should be noted that, a four-direction bullet-screen comment display type is used as an example: A bullet-screen comment whose display type is the four-direction bullet-screen comment display type diverges from the middle to the surrounding, so that abnormal shape processing can be performed on bullet-screen comment information published by the user, that is, the bullet-screen comment is transmitted to the four directions. There are two types of font typesetting for target bullet-screen comments: Horizontal target bullet-screen comment left-right typesetting and vertical target bullet-screen comment up-down typesetting. Font transparency of the target bullet-screen comment may be preset, for example, three random types of transparency are 30%, 20%, and 10%, and may be adjusted according to an actual effect. The movement speed of the target bullet-screen comment can be adjusted according to the length of the bullet-screen comment content. The original bullet-screen comment speed is reduced by 20%, 30%, and 40% at random to obtain three levels of speed, the speed can be adjusted according to an actual effect.

In addition, the bullet-screen comment level, that is, the bullet-screen comment of the one-direction bullet-screen comment display type is above the bullet-screen comment of the multi-direction bullet-screen comment display type. That is, the bullet-screen comment of the multi-direction bullet-screen comment display type is randomly shielded by the bullet-screen comment of the one-direction bullet-screen comment display type. When the font sizes of the bullet-screen comments are large, they can be shielded from each other. Generally, two additional initial rendering tracks may be added if the width of the upward or downward initial rendering track is wider. An appearance effect of the bullet-screen comment may be as follows: Directly appearing, and the tail of the bullet-screen comment is aligned with the preset start position.

In some embodiments, the transparency of the host bullet-screen comment is set to 40%, the font size thereof is the maximum size, and the host bullet-screen comment has a square frame and moves at a slowest bullet-screen comment speed. Other attributes of the host bullet-screen comment are rendered and displayed according to random rules and default rules.

The bullet-screen comment display method provided in this specification may be used in an interactive movie room. The interactive movie room provides a function of displaying a bullet-screen comment of a multi-direction bullet-screen comment display type. For example, a virtual room with a newly added room type identifier "9" is used as an interactive movie room, and a bullet-screen comment with a newly added bullet-screen comment type identifier "3008" is used as a bullet-screen comment of a multi-direction bullet-screen comment display type. The interactive movie room blends bullet-screen comments of the one-direction bullet-screen comment display type and the multi-direction bullet-screen comment display type, that is, the interactive movie room can simultaneously display the bullet-screen comments of the one-direction bullet-screen comment display type and the multi-direction bullet-screen comment display type. In addition, bullet-screen comment settings of the interactive movie room all exist. The bullet-screen comment of the multi-direction bullet-screen comment display type may be independent of the bullet-screen comment settings, and only affected by a bullet-screen comment show/hide switch.

This application provides a bullet-screen comment display method, including: obtaining a to-be-displayed target bullet-screen comment; in a case in which a display type of the target bullet-screen comment is a multi-direction bullet-screen comment display type, obtaining a pre-configured motion parameter corresponding to the multi-direction bullet-screen comment display type, where the multi-direction bullet-screen comment display type is a bullet-screen comment display type in which mobile display is performed from a preset start position to multiple preset movement directions; and dynamically displaying the target bullet-screen comment along a target movement direction from the preset start position based on the motion parameter. When the display type of the target bullet-screen comment is the multi-direction bullet-screen comment display type, different target bullet-screen comments can be dynamically displayed along different target movement directions, thereby avoiding the bullet-screen comment only moving from right to left or from left to right, enriching display manners of the bullet-screen comment, and improving user interest and user viscosity.

Figure 8:
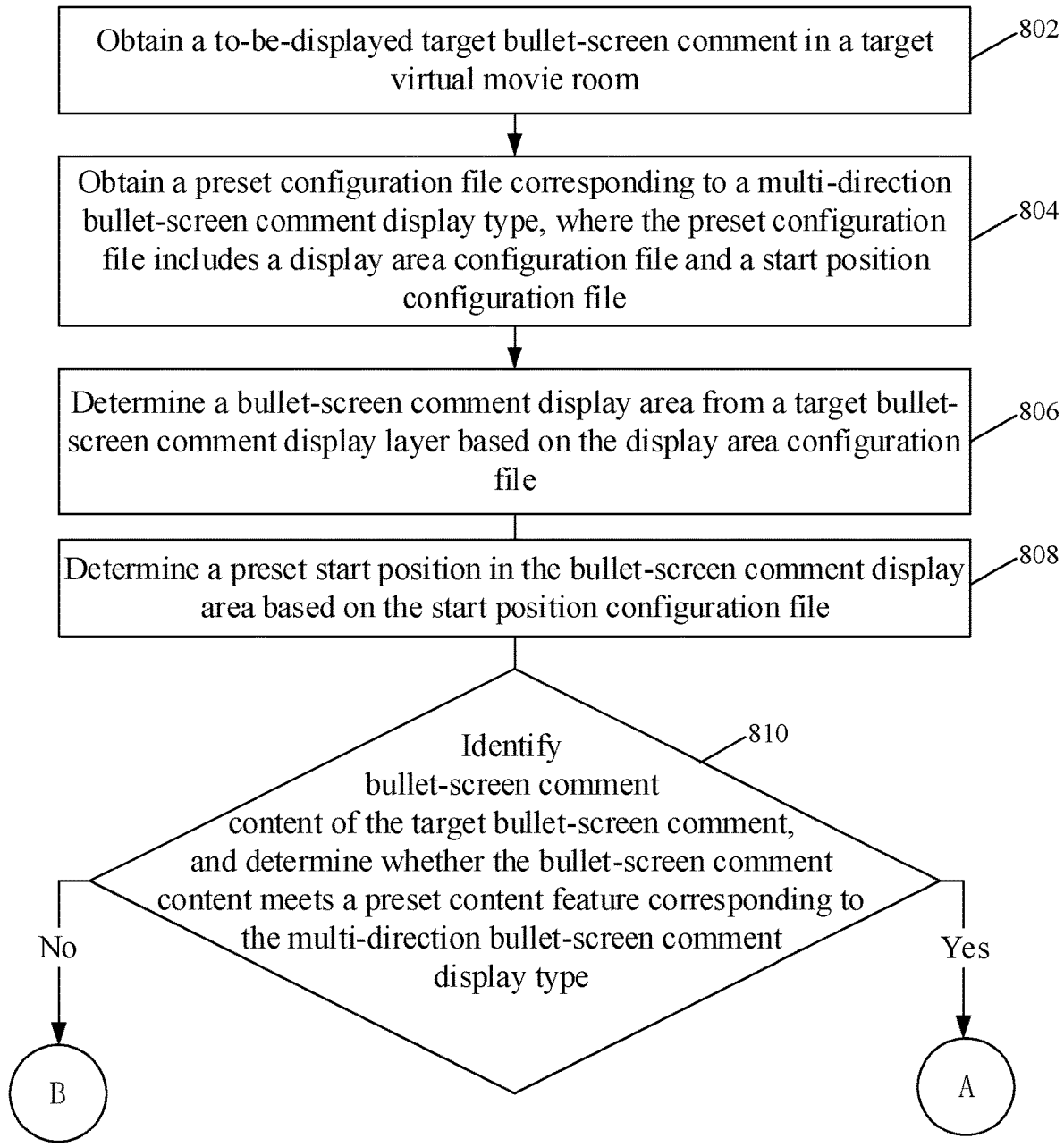
FIG. 8 is a processing flowchart of a bullet-screen comment display method applied to a virtual movie room according to some embodiments of this application.
Figure 8:
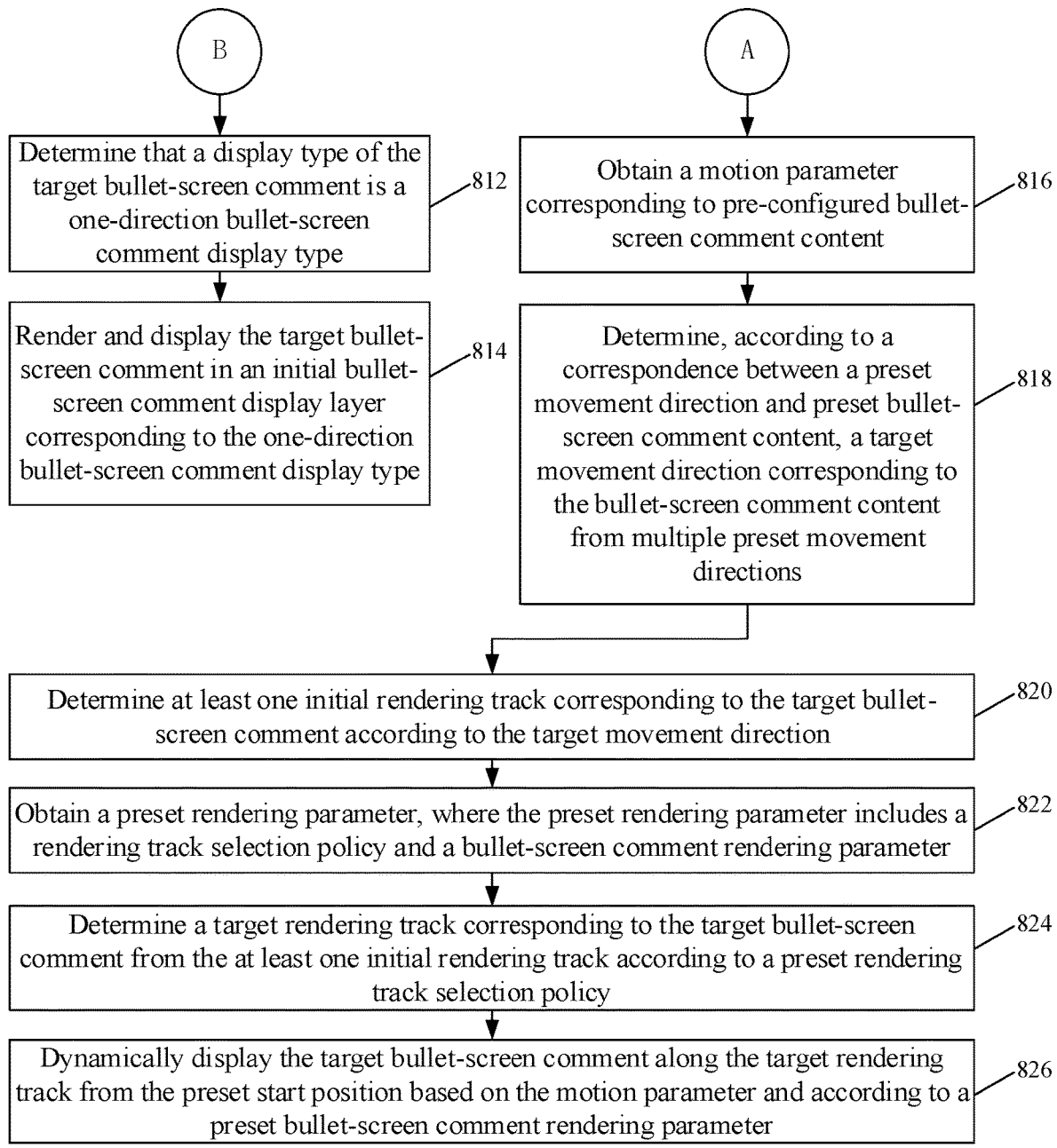

With reference to FIG. 8, the following further describes the bullet-screen comment display method by using an example in which the bullet-screen comment display method provided in this application is applied to a virtual movie room. FIG. 8 is a processing flowchart of a bullet-screen comment display method applied to a virtual movie room according to some embodiments of this application. The method specifically includes the following steps:

Step 802: Obtain a to-be-displayed target bullet-screen comment in a target virtual movie room.

Step 804: Obtain a preset configuration file corresponding to a multi-direction bullet-screen comment display type, where the preset configuration file includes a display area configuration file and a start position configuration file.

Step 806: Determine a bullet-screen comment display area from a target bullet-screen comment display layer based on the display area configuration file.

The target bullet-screen comment display layer is a layer that displays the multi-direction bullet-screen comment display type.

Step 808: Determine a preset start position in the bullet-screen comment display area based on the start position configuration file.

Step 810: Identify bullet-screen comment content of the target bullet-screen comment, and determine whether the bullet-screen comment content meets a preset content feature corresponding to the multi-direction bullet-screen comment display type.

If no, perform step 812. If yes, perform step 816.

Step 812: Determine that a display type of the target bullet-screen comment is a one-direction bullet-screen comment display type.

Step 814: Render and display the target bullet-screen comment in an initial bullet-screen comment display layer corresponding to the one-direction bullet-screen comment display type.

Step 816: Obtain a motion parameter corresponding to pre-configured bullet-screen comment content.

Step 818: Determine, according to a correspondence between a preset movement direction and preset bullet-screen comment content, a target movement direction corresponding to the bullet-screen comment content from multiple preset movement directions.

Step 820: Determine at least one initial rendering track corresponding to the target bullet-screen comment according to the target movement direction.

Step 822: Obtain a preset rendering parameter, where the preset rendering parameter includes a rendering track selection policy and a bullet-screen comment rendering parameter.

Step 824: Determine a target rendering track corresponding to the target bullet-screen comment from the at least one initial rendering track according to a preset rendering track selection policy.

Step 826: Dynamically display the target bullet-screen comment along the target rendering track from the preset start position based on the motion parameter and according to a preset bullet-screen comment rendering parameter.

According to the bullet-screen comment display method provided in this application, when it is determined by using the bullet-screen comment content that the display type is the multi-direction bullet-screen comment display type, different target bullet-screen comments can be dynamically displayed along different target movement directions, thereby avoiding the bullet-screen comment only moving from right to left or from left to right, enriching display manners of the bullet-screen comment, and improving user interest and user viscosity. In addition, the bullet-screen comment type can be identified by using the bullet-screen comment content, so that the bullet-screen comment display efficiency can be improved.

Figure 9:
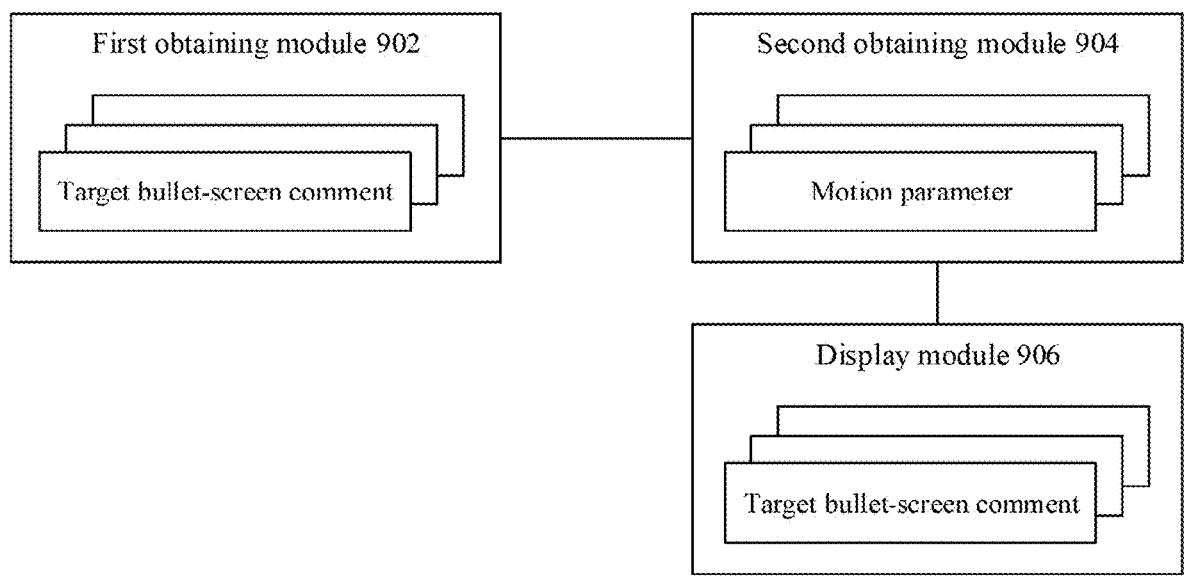
FIG. 9 is a schematic diagram of a structure of a bullet-screen comment display apparatus according to some embodiments of this application.

Corresponding to the foregoing method embodiments, this application further provides some embodiments of a bullet-screen comment display apparatus. FIG. 9 is a schematic diagram of a structure of a bullet-screen comment display apparatus according to some embodiments of this application. As shown in FIG. 9, the apparatus includes:

a first obtaining module 902, configured to obtain a to-be-displayed target bullet-screen comment;

a second obtaining module 904, configured to: in a case in which a display type of the target bullet-screen comment is a multi-direction bullet-screen comment display type, obtain a pre-configured motion parameter corresponding to the multi-direction bullet-screen comment display type, where the multi-direction bullet-screen comment display type is a bullet-screen comment display type in which mobile display is performed from a preset start position to multiple preset movement directions; and a display module 906, configured to dynamically display the target bullet-screen comment along a target movement direction from the preset start position based on the motion parameter.

In some embodiments, the apparatus further includes a configuration module, configured to:

obtain a preset configuration file corresponding to the multi-direction bullet-screen comment display type; and configure a target bullet-screen comment display layer based on the preset configuration file, where the target bullet-screen comment display layer is a layer that displays the multi-direction bullet-screen comment display type.

In some embodiments, the preset configuration file includes a display area configuration file and a start position configuration file; and the configuration module is further configured to:

determine a bullet-screen comment display area from the target bullet-screen comment display layer based on the display area configuration file; and determine the preset start position in the bullet-screen comment display area based on the start position configuration file.

In some embodiments, the apparatus further includes an identification module, configured to:

identify bullet-screen comment content of the target bullet-screen comment; and determine a display type of the target bullet-screen comment according to the bullet-screen comment content.

In some embodiments, the apparatus further includes an identification module, further configured to:

determine whether the bullet-screen comment content meets a preset content feature corresponding to the multi-direction bullet-screen comment display type; and if yes, determine that the display type of the target bullet-screen comment is the multi-direction bullet-screen comment display type.

In some embodiments, the apparatus further includes a determining module, configured to:

determine, according to a correspondence between a preset movement direction and preset bullet-screen comment content, a target movement direction corresponding to the bullet-screen comment content from the multiple preset movement directions.

In some embodiments, the display module 906 is further configured to:

determine, according to the target movement direction, at least one initial rendering track corresponding to the target bullet-screen comment; and dynamically display the target bullet-screen comment along a target rendering track in the at least one initial rendering track from the preset start position based on the motion parameter.

In some embodiments, the display module 906 is further configured to:

determine a target rendering track corresponding to the target bullet-screen comment from the at least one initial rendering track according to a preset rendering track selection policy; and dynamically display the target bullet-screen comment along the target rendering track from the preset start position based on the motion parameter and according to a preset bullet-screen comment rendering parameter.

In some embodiments, the display module 906 is further configured to:

obtain a preset rendering parameter; and dynamically display the target bullet-screen comment along a target movement direction from the preset start position based on the motion parameter and the preset rendering parameter.

The bullet-screen comment display apparatus provided in this application obtains a to-be-displayed target bullet-screen comment; in a case in which a display type of the target bullet-screen comment is a multi-direction bullet-screen comment display type, obtains a pre-configured motion parameter corresponding to the multi-direction bullet-screen comment display type, where the multi-direction bullet-screen comment display type is a bullet-screen comment display type in which mobile display is performed from a preset start position to multiple preset movement directions; and dynamically displays the target bullet-screen comment along a target movement direction from the preset start position based on the motion parameter. When the display type of the target bullet-screen comment is the multi-direction bullet-screen comment display type, different target bullet-screen comments can be dynamically displayed along different target movement directions, thereby avoiding the bullet-screen comment only moving from right to left or from left to right, enriching display manners of the bullet-screen comment, and improving user interest and user viscosity.

The foregoing describes a schematic solution of the bullet-screen comment display apparatus in the embodiments. It is worthwhile to note that the technical solution of the bullet-screen comment display apparatus and the technical solution of the foregoing bullet-screen comment display method belong to the same concept. For details not described in the technical solution of the bullet-screen comment display apparatus, references can be made to the descriptions of the technical solution of the foregoing bullet-screen comment display method.

Figure 10:
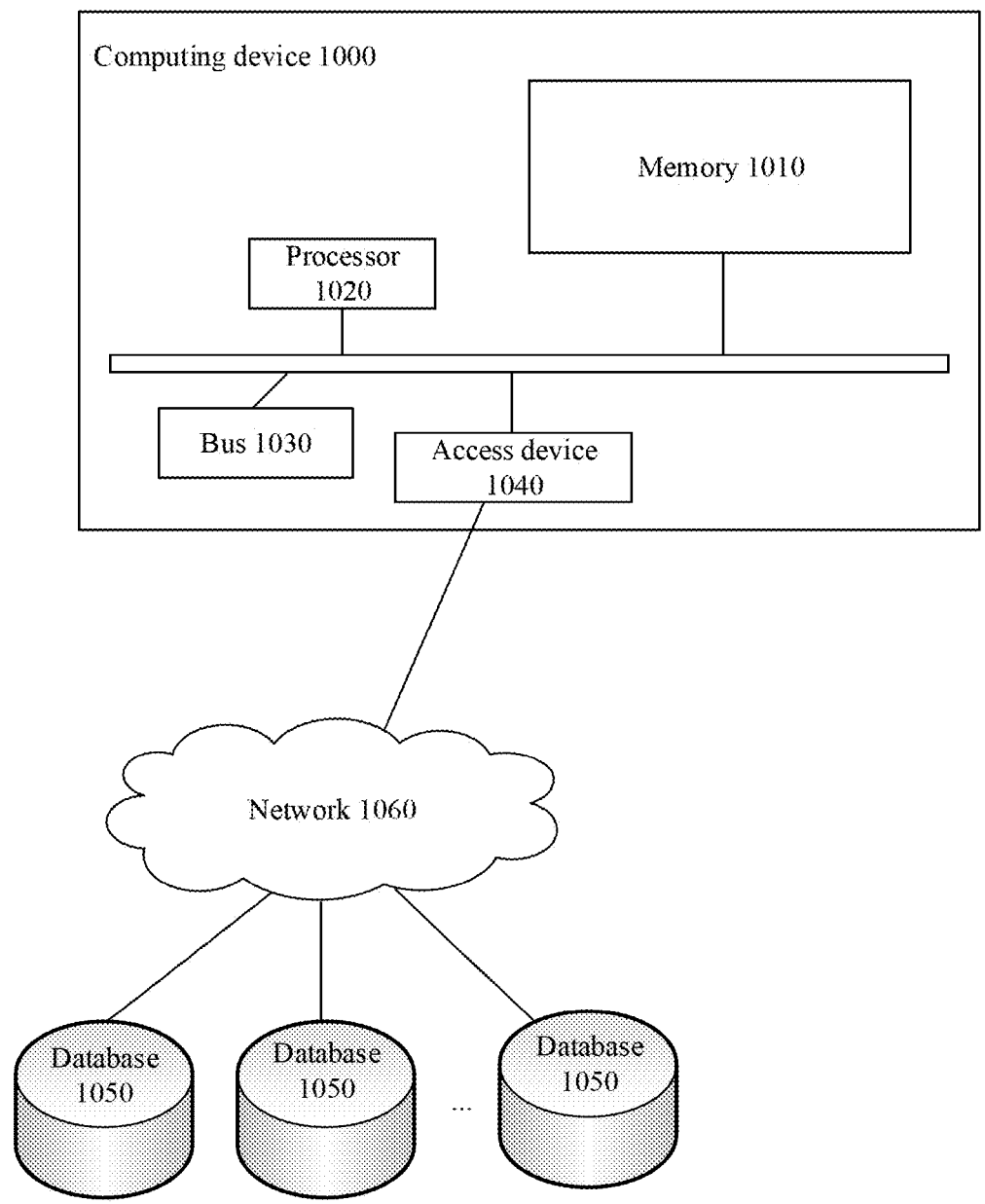
FIG. 10 is a block diagram of a structure of a computing device according to some embodiments of this application.

FIG. 10 is a block diagram illustrating a structure of a computing device 1000 according to some embodiments of this application. Components of the computing device 1000 include but are not limited to a memory 1010 and a processor 1020. The processor 1020 and the memory 1010 are connected by using a bus 1030, and a database 1050 is configured to store data.

The computing device 1000 further includes an access device 1040, and the access device 1040 enables the computing device 1000 to communicate via one or more networks 1060. Examples of these networks include a public switched telephone network (PSTN), a local area network (LAN), a wide area network (WAN), a private area network (PAN), or a combination of communications networks such as the Internet. The access device 1040 may include one or more of any types of wired or wireless network interfaces (for example, a network interface controller (NIC)), for example, an IEEE 802.11 wireless local area network (WEAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In some embodiments of this application, the foregoing components of the computing device 1000 and other components not shown in FIG. 10 may alternatively be connected to each other, for example, by using the bus. It should be understood that the block diagram of the structure of the computing device shown in FIG. 10 is merely used as an example instead of a limitation on the scope of this application. A person skilled in the art may add or substitute other components as required.

The computing device 1000 may be any type of static or mobile computing device, including: a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses); another type of mobile device; or a static computing device, for example, a desktop computer or a PC. The computing device 1000 may be alternatively a mobile or static server.

The processor 1020 performs the steps of the bullet-screen comment display method when executing the computer instructions.

The foregoing describes a schematic solution of a computing device in the embodiments. It should be noted that the technical solution of the computing device and the technical solution of the bullet-screen comment display method belong to a same concept. For details not described in detail in the technical solution of the computing device, refer to the descriptions of the technical solution of the bullet-screen comment display method.

Some embodiments of this application further provides a computer-readable storage medium, where the computer-readable storage medium stores computer instructions, and when the computer instructions are executed by a processor, the steps of the bullet-screen comment display method are implemented.

The foregoing describes a schematic solution of a computer-readable storage medium in the embodiments. It should be noted that the technical solution of the storage medium and the technical solution of the bullet-screen comment display method belong to a same concept. For details not described in detail in the technical solution of the storage medium, refer to the descriptions of the technical solution of the bullet-screen comment display method.

Specific embodiments of this application are described above. Other embodiments fall within the scope of the appended claims. In some situations, the actions or steps recorded in the claims can be performed in an order different from the order in the embodiments and the desired results can still be achieved. In addition, the process depicted in the accompanying drawings does not necessarily require the shown particular execution order to achieve the desired results. In some implementations, multi-tasking and parallel processing can or may be advantageous.

The computer instructions include computer program code, which may be in a source code form, an object code form, an executable file, an intermediate form, or the like. The computer-readable medium may include: any physical entity or apparatus capable of carrying the computer program code, a recording medium, a USB disk, a mobile hard disk drive, a magnetic disk, an optical disc, a computer memory, a read-only memory (ROM), a random access memory (RAM), an electrical carrier signal, a telecommunications signal, a software distribution medium, and the like.

It is worthwhile to note that, for ease of description, the foregoing method embodiments are described as a combination of a series of actions. However, a person skilled in the art should understand that this application is not limited to the described action sequence, because according to this application, some steps may be performed in another order or simultaneously. In addition, a person skilled in the art should also understand that the embodiments described in the specification are all embodiments, and involved actions and modules are not necessarily mandatory to this application.

In the foregoing embodiments, descriptions of the embodiments have respective focuses. For a part that is not described in detail in an embodiment, references can be made to related descriptions in another embodiment.

Some embodiments of this application disclosed above are merely intended to help describe this application. The optional embodiments do not describe all details, and the present invention is not limited to the specific implementations. Clearly, many modifications and changes may be made based on the content of this application. The embodiments are selected and specifically described in this application to better explain the principle and actual application of this application, so that a person skilled in the art can better understand and use this application. This application is only subjected to the claims and the scope and equivalents thereof

What is claimed is:

1. A method, comprising:
   obtaining a to-be-displayed target bullet-screen comment;
   in a case in which a display type of the target bullet-screen comment is a multi-direction bullet-screen comment display type, obtaining a pre-configured motion parameter corresponding to the multi-direction bullet-screen comment display type, wherein the multi-direction bullet-screen comment display type is a bullet-screen comment display type in which mobile display is performed from a preset start position to multiple preset movement directions; and
   dynamically displaying the target bullet-screen comment along a target movement direction from the preset start position based on the motion parameter.

2. The method according to claim 1, further comprising: before the dynamically displaying the target bullet-screen comment along the target movement direction from the preset start position based on the motion parameter,
   obtaining a preset configuration file corresponding to the multi-direction bullet-screen comment display type; and
   configuring a target bullet-screen comment display layer based on the preset configuration file, wherein the target bullet-screen comment display layer is a layer that displays the multi-direction bullet-screen comment display type.

3. The method according to claim 2, wherein the preset configuration file comprises a display area configuration file and a start position configuration file; and
   the configuring the target bullet-screen comment display layer based on the preset configuration file comprises:
   determining a bullet-screen comment display area from the target bullet-screen comment display layer based on the display area configuration file; and
   determining the preset start position in the bullet-screen comment display area based on the start position configuration file.

4. The method according to claim 1, further comprising: before the obtaining the pre-configured motion parameter corresponding to the multi-direction bullet-screen comment display type,
   identifying bullet-screen comment content of the target bullet-screen comment; and determining a display type of the target bullet-screen comment according to the bullet-screen comment content.

5. The method according to claim 4, wherein the determining the display type of the target bullet-screen comment according to the bullet-screen comment content comprises:
determining whether the bullet-screen comment content meets a preset content feature corresponding to the multi-direction bullet-screen comment display type; and
in response to the bullet-screen comment content meets the preset content feature corresponding to the multi-direction bullet-screen comment display type, determining that the display type of the target bullet-screen comment is the multi-direction bullet-screen comment display type.

6. The method according to claim 1, further comprising: before the dynamically displaying the target bullet-screen comment along the target movement direction from the preset start position based on the motion parameter,
determining, according to a correspondence between a preset movement direction and preset bullet-screen comment content, a target movement direction corresponding to the bullet-screen comment content from the multiple preset movement directions.

7. The method according to claim 1, wherein the dynamically displaying the target bullet-screen comment along the target movement direction from the preset start position based on the motion parameter comprises:
determining, according to the target movement direction, at least one initial rendering track corresponding to the target bullet-screen comment; and
dynamically displaying the target bullet-screen comment along a target rendering track in the at least one initial rendering track from the preset start position based on the motion parameter.

8. The method according to claim 7, wherein the dynamically displaying the target bullet-screen comment along the target rendering track in the at least one initial rendering track from the preset start position based on the motion parameter comprises:
determining a target rendering track corresponding to the target bullet-screen comment from the at least one initial rendering track according to a preset rendering track selection policy; and
dynamically displaying the target bullet-screen comment along the target rendering track from the preset start position based on the motion parameter and according to a preset bullet-screen comment rendering parameter.

9. The method according to claim 1, wherein the dynamically displaying the target bullet-screen comment along the target movement direction from the preset start position based on the motion parameter comprises:
obtaining a preset rendering parameter; and
dynamically displaying the target bullet-screen comment along a target movement direction from the preset start position based on the motion parameter and the preset rendering parameter.

10. A computing device, comprising:
one or more processors; and
a memory storing one or more programs configured to be executed by the one or more processors, the one or more programs comprising instructions for:
obtaining a to-be-displayed target bullet-screen comment;
in a case in which a display type of the target bullet-screen comment is a multi-direction bullet-screen comment display type, obtaining a pre-configured motion parameter corresponding to the multi-direction bullet-screen comment display type, wherein the multi-direction bullet-screen comment display type is a bullet-screen comment display type in which mobile display is performed from a preset start position to multiple preset movement directions; and
dynamically displaying the target bullet-screen comment along a target movement direction from the preset start position based on the motion parameter.

11. The computing device according to claim 10, the one or more programs further comprising instructions for: before the dynamically displaying the target bullet-screen comment along the target movement direction from the preset start position based on the motion parameter,
obtaining a preset configuration file corresponding to the multi-direction bullet-screen comment display type; and
configuring a target bullet-screen comment display layer based on the preset configuration file, wherein the target bullet-screen comment display layer is a layer that displays the multi-direction bullet-screen comment display type.

12. The computing device according to claim 11, wherein the preset configuration file comprises a display area configuration file and a start position configuration file; and
the configuring the target bullet-screen comment display layer based on the preset configuration file comprises:
determining a bullet-screen comment display area from the target bullet-screen comment display layer based on the display area configuration file; and
determining the preset start position in the bullet-screen comment display area based on the start position configuration file.

13. The computing device according to claim 10, the one or more programs comprising instructions for: before the obtaining the pre-configured motion parameter corresponding to the multi-direction bullet-screen comment display type,
identifying bullet-screen comment content of the target bullet-screen comment; and
determining a display type of the target bullet-screen comment according to the bullet-screen comment content.

14. The computing device according to claim 13, wherein the determining the display type of the target bullet-screen comment according to the bullet-screen comment content comprises:
determining whether the bullet-screen comment content meets a preset content feature corresponding to the multi-direction bullet-screen comment display type; and
in response to the bullet-screen comment content meets the preset content feature corresponding to the multi-direction bullet-screen comment display type, determining that the display type of the target bullet-screen comment is the multi-direction bullet-screen comment display type.

15. The computing device according to claim 10, the one or more programs comprising instructions for: before the dynamically displaying the target bullet-screen comment along the target movement direction from the preset start position based on the motion parameter,
determining, according to a correspondence between a preset movement direction and preset bullet-screen comment content, a target movement direction corresponding to the bullet-screen comment content from the multiple preset movement directions.

16. The computing device according to claim 10, wherein the dynamically displaying the target bullet-screen comment along the target movement direction from the preset start position based on the motion parameter comprises:
- determining, according to the target movement direction, at least one initial rendering track corresponding to the target bullet-screen comment; and
- dynamically displaying the target bullet-screen comment along a target rendering track in the at least one initial rendering track from the preset start position based on the motion parameter.

17. The computing device according to claim 16, wherein the dynamically displaying the target bullet-screen comment along the target rendering track in the at least one initial rendering track from the preset start position based on the motion parameter comprises:
- determining a target rendering track corresponding to the target bullet-screen comment from the at least one initial rendering track according to a preset rendering track selection policy; and
- dynamically displaying the target bullet-screen comment along the target rendering track from the preset start position based on the motion parameter and according to a preset bullet-screen comment rendering parameter.

18. The computing device according to claim 10, wherein the dynamically displaying the target bullet-screen comment along the target movement direction from the preset start position based on the motion parameter comprises:
- obtaining a preset rendering parameter; and
- dynamically displaying the target bullet-screen comment along a target movement direction from the preset start position based on the motion parameter and the preset rendering parameter.

19. A non-transitory computer-readable storage medium storing one or more programs comprising instructions that, when executed by one or more processors of a computing device, cause the computing device to perform operations comprising:
- obtaining a to-be-displayed target bullet-screen comment;
- in a case in which a display type of the target bullet-screen comment is a multi-direction bullet-screen comment display type, obtaining a pre-configured motion parameter corresponding to the multi-direction bullet-screen comment display type, wherein the multi-direction bullet-screen comment display type is a bullet-screen comment display type in which mobile display is performed from a preset start position to multiple preset movement directions; and
- dynamically displaying the target bullet-screen comment along a target movement direction from the preset start position based on the motion parameter.

20. The non-transitory computer-readable storage medium according to claim 19, the instructions, when executed by one or more processors of the computing device, further causing the computing device to perform operations comprising: before the dynamically displaying the target bullet-screen comment along the target movement direction from the preset start position based on the motion parameter,
- obtaining a preset configuration file corresponding to the multi-direction bullet-screen comment display type; and
- configuring a target bullet-screen comment display layer based on the preset configuration file, wherein the target bullet-screen comment display layer is a layer that displays the multi-direction bullet-screen comment display type.

\* \* \* \* \*